United States Patent
Song et al.

(10) Patent No.: US 10,855,185 B2
(45) Date of Patent: Dec. 1, 2020

(54) SEMICONDUCTOR CIRCUIT INCLUDING A DC-DC CONVERTER AND A VOLTAGE REGULATOR

(71) Applicant: Samsung Electronics Co., Ltd., Suwon-si (KR)

(72) Inventors: Ki Jae Song, Asan-si (KR); Jong Woon Yoo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 54 days.

(21) Appl. No.: 16/394,611

(22) Filed: Apr. 25, 2019

(65) Prior Publication Data

US 2020/0083810 A1 Mar. 12, 2020

(30) Foreign Application Priority Data

Sep. 10, 2018 (KR) .......................... 10-2018-0107859

(51) Int. Cl.
*H02M 3/158* (2006.01)
*G05F 1/56* (2006.01)
(Continued)

(52) U.S. Cl.
CPC ............ *H02M 3/1584* (2013.01); *G05F 1/56* (2013.01); *H02M 3/157* (2013.01); *H02M 2001/0012* (2013.01); *H02M 2001/0045* (2013.01)

(58) Field of Classification Search
CPC ... G05F 1/618; G05F 1/00; G05F 1/10; G05F 1/56; G05F 1/565; G05F 1/575; G05F 1/70; G05F 1/42; G05F 1/4255; H02M 3/158; H02M 3/1588; H02M 3/157; H02M 3/156; H02M 3/1563; H02M 7/06; H02M 2001/0045
(Continued)

(56) References Cited

U.S. PATENT DOCUMENTS 7,030,596 B1 * 4/2006 Salerno ................. H02M 3/158
323/282
7,203,847 B2 * 4/2007 Park ........................ G06F 1/263
713/300
(Continued)

FOREIGN PATENT DOCUMENTS

JP H06335238 A 12/1994
JP 2005-312141 A 11/2005
(Continued)

*Primary Examiner* — Thienvu V Tran
*Assistant Examiner* — Nusrat Quddus
(74) *Attorney, Agent, or Firm* — Harness, Dickey and Pierce, P.L.C.

(57) ABSTRACT

A semiconductor circuit includes a reference voltage generating circuit which generates a first reference voltage; a voltage control circuit which receives the first reference voltage from the reference voltage generating circuit to output a second reference voltage; a DC-DC conversion circuit which executes DC-DC conversion on the basis of the second reference voltage which is output from the voltage control circuit, and provides an output thereof to a first node; and a voltage regulator which executes voltage regulating on the basis of the first reference voltage which is output from the reference voltage generating circuit, and a voltage of the first node, and provides an output thereof to a second node.

19 Claims, 12 Drawing Sheets

(51) Int. Cl.
*H02M 3/157* (2006.01)
*H02M 1/00* (2006.01)

(58) Field of Classification Search
USPC .......................................... 323/266, 270, 271
See application file for complete search history.

(56) References Cited

U.S. PATENT DOCUMENTS

| | | | |
|---|---|---|---|
| 7,253,596 B2* | 8/2007 | Yamamoto | H02M 3/1588 |
| | | | 323/281 |
| 7,397,151 B2* | 7/2008 | Ishino | H02M 3/1584 |
| | | | 307/150 |
| 7,489,118 B2 | 2/2009 | Fujii | |
| 7,952,335 B2* | 5/2011 | Gerritsen | H02M 3/1582 |
| | | | 323/282 |
| 8,026,636 B2 | 9/2011 | Oh | |
| 8,129,977 B2* | 3/2012 | Noda | H02M 3/158 |
| | | | 323/281 |
| 8,193,798 B1* | 6/2012 | Pace | H02M 3/156 |
| | | | 323/284 |
| 8,866,460 B2* | 10/2014 | Huang | G05F 1/46 |
| | | | 323/274 |
| 8,922,180 B2* | 12/2014 | Attianese | G05F 1/46 |
| | | | 323/282 |
| 2007/0279018 A1 | 12/2007 | Sumitomo et al. | |
| 2008/0175087 A1* | 7/2008 | Kim | G11C 5/147 |
| | | | 365/226 |
| 2010/0060078 A1* | 3/2010 | Shaw | G05F 1/56 |
| | | | 307/31 |
| 2010/0134085 A1* | 6/2010 | Nishida | H02M 3/1563 |
| | | | 323/285 |
| 2011/0156672 A1* | 6/2011 | Gakhar | G05F 1/565 |
| | | | 323/280 |
| 2013/0169246 A1* | 7/2013 | Shao | G05F 1/56 |
| | | | 323/266 |
| 2015/0261235 A1* | 9/2015 | Ng | G05F 1/595 |
| | | | 323/270 |
| 2017/0310204 A1* | 10/2017 | Kawano | H02M 1/08 |

FOREIGN PATENT DOCUMENTS

| | | |
|---|---|---|
| JP | 2008-017550 A | 1/2008 |
| KR | 10-1017297 B1 | 2/2011 |
| KR | 20180056003 A | 5/2018 |
| KR | 20180060904 A | 6/2018 |
| KR | 20180063215 A | 6/2018 |

* cited by examiner

SEMICONDUCTOR CIRCUIT INCLUDING A DC-DC CONVERTER AND A VOLTAGE REGULATOR

CROSS-REFERENCE TO RELATED APPLICATION

This application claims the benefit of Korean Patent Application No. 10-2018-0107859, filed on Sep. 10, 2018, in the Korean Intellectual Property Office, the disclosure of which is incorporated herein in its entirety by reference.

BACKGROUND

1. Field of the Disclosure

The present disclosure relates to a semiconductor circuit.

2. Description of the Related Art

A voltage regulator that executes voltage regulating generally requires an input voltage higher than a desired output voltage to maintain the desired output voltage. However, there may be a problem in which, as a difference between the input voltage and the output voltage increases, a power loss occurs, and a heat generation may become severe. For example, when the output voltage of the voltage regulator falls within the range of 1 V to 5 V, if the input voltage is fixed to, for example, 7 V, in a situation in which the output voltage of the voltage regulator is output at about 1 V, the power loss and the heat generation may become severe.

In particular, when the voltage regulator and a DC-DC conversion circuit are integrally implemented, the input voltage of the voltage regulator may be determined based on the output voltage of the DC-DC conversion circuit. If the output of the DC-DC conversion circuit is fixed to, for example, 7 V as in the previous example, the power loss and the heat generation due to fluctuation of the output voltage of the voltage regulator may occur.

SUMMARY

At least some example embodiments of the present disclosure provide a semiconductor circuit capable of regulating voltage while reducing a power loss and heat generation even in a fluctuation of an output voltage of a voltage regulator.

However, example embodiments of the present disclosure are not restricted to the one set forth herein. The above and other example embodiments of the present disclosure will become more apparent to one of ordinary skill in the art to which the present disclosure pertains by referencing the detailed description of the present disclosure given below.

According to an example embodiments of the present disclosure, there is provided a semiconductor circuit including a reference voltage generating circuit configured to generate a first reference voltage; a voltage control circuit configured to receive the first reference voltage from the reference voltage generating circuit, and to generate a second reference voltage based on at least the first reference voltage; a DC-DC conversion circuit configured to perform DC-DC conversion based on the second reference voltage to generate an input voltage, and to provide the input voltage to a first node; and a voltage regulator configured to generate an output voltage by regulating the input voltage based on the first reference voltage and the input voltage, and to provide the output voltage to a second node.

According to another example embodiments of the present disclosure, there is provided a semiconductor circuit including a reference voltage generating circuit configured to generate a first reference voltage; a DC-DC conversion circuit configured to perform DC-DC conversion based on a second reference voltage to generate an input voltage, and to provide the input voltage to a first node, the second reference voltage having a voltage level different from the first reference voltage; and a voltage regulator configured to generate an output voltage by regulating the input voltage based on the first reference voltage and the input voltage, and to provide the output voltage to a second node, wherein the semiconductor circuit is configured to maintain a constant difference between the input voltage output by the DC-DC conversion circuit and the output voltage output by the voltage regulator such that the constant difference corresponds to a difference between the second reference voltage and the first reference voltage irrespective of variations in the input voltage due to fluctuations in the output voltage.

According to still another example embodiments of the present disclosure, there is provided a semiconductor circuit including a reference voltage generating circuit configured to generate a first reference voltage; a voltage control circuit configured to receive the first reference voltage from the reference voltage generating circuit, and to generate a second reference voltage based on at least the first reference voltage; a DC-DC conversion circuit configured to generate an input voltage, the input voltage being applied to a first node, the DC-DC conversion circuit including a first comparator, the first comparator having a non-inverting terminal and an inverting terminal, the non-inverting terminal configured to receive the second reference voltage and the inverting terminal configured to receive the input voltage applied to the first node; and a voltage regulator configured to generate an output voltage, the voltage regulator including a second comparator, the second comparator having an inverting terminal configured to receive the first reference voltage, the output voltage being applied to a second node.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
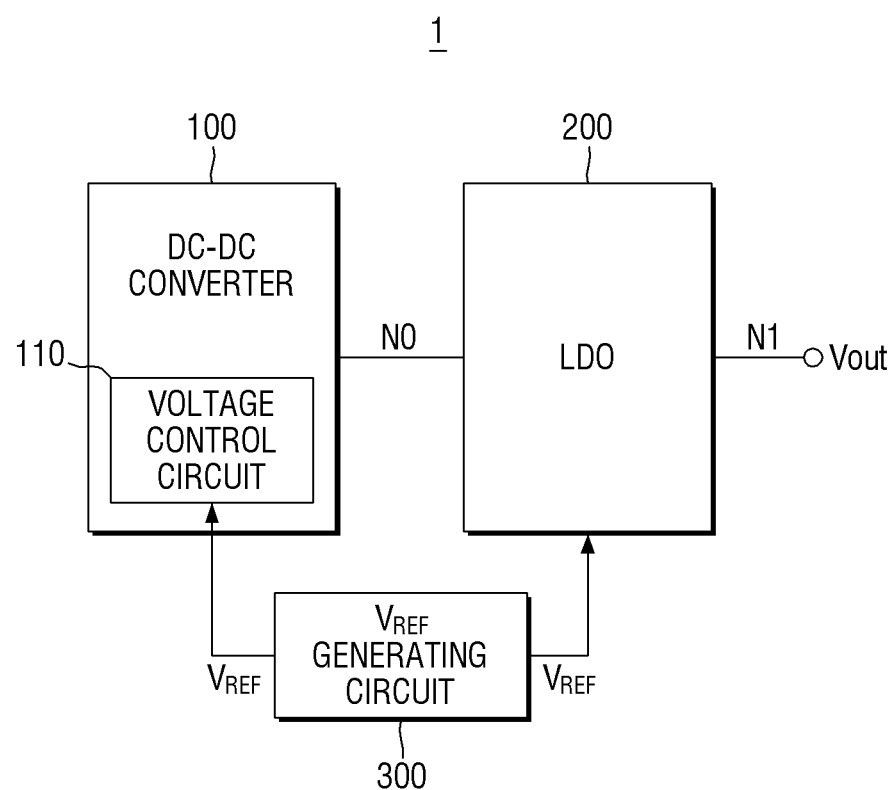
FIG. 1 is a schematic diagram for explaining a semiconductor system according to an example embodiment of the present disclosure.

FIG. 1 is a schematic diagram for explaining a semiconductor system according to an example embodiment of the present disclosure.

Referring to FIG. 1, a semiconductor system 1 according to an example embodiment of the present disclosure includes a DC-DC conversion circuit 100, a voltage regulator 200 and a reference voltage generating circuit 300.

The DC-DC conversion circuit 100 executes DC-DC conversion on the basis of a first reference voltage VREF provided from the reference voltage generating circuit 300. Further, the DC-DC conversion circuit 100 provides the output voltage subjected to DC-DC conversion to the first node N0.

The voltage regulator 200 executes the voltage regulating on the basis of the first reference voltage VREF provided from the reference voltage generating circuit 300. In particular, in an example embodiment, the voltage regulator 200 executes the voltage regulating, using the voltage of the first node N0 as an input voltage. The voltage regulator 200 provides the output to the second node N1. The voltage Vout which is output from the voltage regulator 200 may be used as a drive voltage for driving another semiconductor device.

In some example embodiments of the present disclosure, the voltage regulator 200 may include an LDO (Low Drop Output) linear regulator, but the scope of the present disclosure is not limited thereto.

The reference voltage generating circuit 300 generates the first reference voltage VREF, and provides the first reference voltage VREF to the DC-DC conversion circuit 100 and the voltage regulator 200. The first reference voltage VREF provided to the DC-DC conversion circuit 100 may be used to adjust the level of the output voltage of the DC-DC conversion circuit 100. On the other hand, the first reference voltage VREF provided to the voltage regulator 200 may be used to adjust the level of the output voltage of the voltage regulator 200.

The voltage level of the first node N0 corresponding to the input of the voltage regulator 200 is higher than the voltage level of the second node N1 corresponding to the output of the voltage regulator 200. However, when the output of the voltage regulator 200 is determined, for example, in the range of 1 V to 5 V, if the voltage of the first node N0 is fixed to, for example, 7 V, problems of power loss and heat generation may occur when the voltage regulator 200 is output to about 1 V.

In order to address such a problem, in one or more example embodiments, the DC-DC conversion circuit 100 may include a voltage control circuit 110.

As discussed in more detail below with reference to FIG. 2, the voltage control circuit 110 is a circuit that receives the first reference voltage VREF from the reference voltage generating circuit 300 to output a second reference voltage VREF'. That is, the voltage control circuit 110 inhibits the reference voltage generating circuit 300 from immediately providing the first reference voltage VREF to the DC-DC conversion circuit 100, outputs a second reference voltage VREF' adjusted to reduce (or, alternatively, prevent) an increase in a difference between a voltage level of a first node N0 corresponding to the input of the voltage regulator 200 and a voltage level of a second node N1 corresponding to the output of the voltage regulator 200, and provides the second reference voltage VREF' to the DC-DC conversion circuit 100.

As a result, the DC-DC conversion circuit 100 executes the DC-DC conversion on the basis of the second reference voltage VREF' that is output from the voltage control circuit 110, and outputs the output to the first node N0. Further, the voltage regulator 200 executes the voltage regulating on the basis of the first reference voltage VREF that is output from the reference voltage generating circuit 300 and the voltage of the first node N0, and outputs the output thereof to the second node N1.

An example embodiment of the semiconductor system 1 according to an example embodiment of the present disclosure will now be described referring to FIG. 2.

Figure 2:
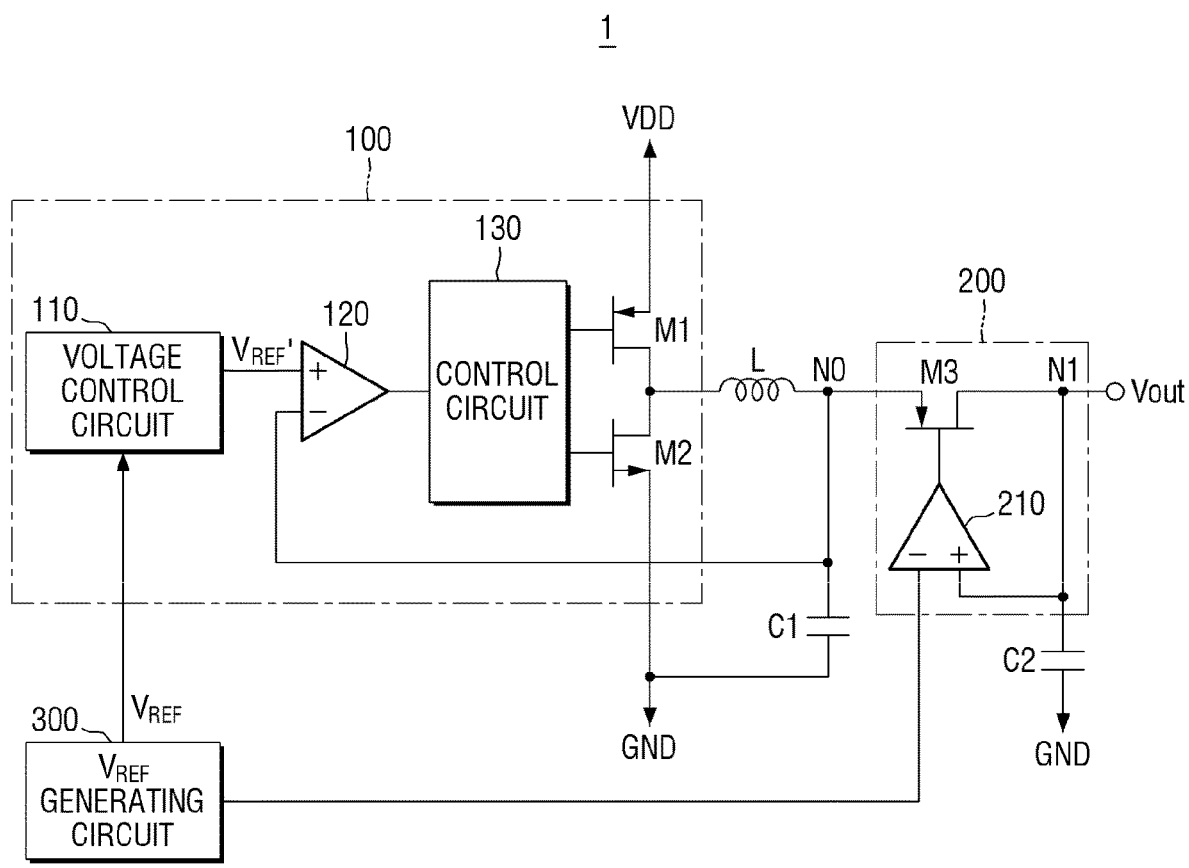
FIG. 2 is a circuit diagram for explaining the semiconductor system according to an example embodiment of the present disclosure.

FIG. 2 is a circuit diagram for explaining a semiconductor system according to an example embodiment of the present disclosure.

Referring to FIG. 2, the semiconductor system 1 according to an example embodiment of the present disclosure includes a DC-DC conversion circuit 100, a voltage regulator 200 and a reference voltage generating circuit 300.

The DC-DC conversion circuit 100 includes a voltage control circuit 110, a first comparator 120, a control circuit 130, a first transistor M1, and a second transistor M2.

The voltage control circuit 110 receives the first reference voltage VREF from the reference voltage generating circuit 300 to output the second reference voltage VREF' and provides the second reference voltage VREF' to the first comparator 120.

The first comparator 120 includes a non-inverting terminal (+) and an inverting terminal (−) as input terminals. The second reference voltage VREF' provided from the voltage control circuit 110 is applied to the non-inverting terminal (+). The voltage of the first node N0 corresponding to the output of the DC-DC conversion circuit 100 is applied to the inverting terminal (−). The first comparator 120 provides a result signal obtained by comparing the non-inverting terminal (+) and the inverting terminal (−) to the control circuit 130.

The control circuit 130 receives the output signal of the first comparator 120 and outputs the first control signal and the second control signal. The control circuit 130 may turn the first transistor M1 and the second transistor M2 on and off, using the first control signal and the second control signal in accordance with the comparison results of the first comparator 120.

The first transistor M1 is gated by the first control signal provided from the control circuit 130 and provides a power supply voltage VDD to the first node N0. The second transistor M2 is gated by the second control signal provided from the control circuit 130 and provides a ground voltage GND to the first node N0.

In an example embodiment, the first transistor M1 may be a P type transistor and the second transistor M2 may be an N type transistor, but the scope of the present disclosure is not limited thereto. In this case, a source of the first transistor M1 is connected to the power supply voltage VDD, a drain of the first transistor M1 is connected to s drain of the second transistor M1, and a source of the second transistor M1 may be connected to the ground voltage GND.

The voltage regulator 200 includes a second comparator 210 and a third transistor M3.

The first reference voltage VREF provided from the reference voltage generating circuit 300 is applied to the inverting terminal (−) of the second comparator 210. The voltage of the second node N1 corresponding to the output of the voltage regulator 200 is applied to the non-inverting terminal (+). The second comparator 210 provides the result signal obtained by comparing the non-inverting terminal (+) with the inverting terminal (−) to the third transistor M3.

The third transistor M3 is gated by the output signal of the second comparator 210 and provides the voltage of the first node N0 to the second node N1. In this example embodiment, the third transistor M3 may be a P type transistor, but the scope of the present disclosure is not limited thereto. In this case, the source of the third transistor M3 may be connected to the first node N0, and the drain of the third transistor M3 may be connected to the second node N1.

When the third transistor M3 is the P type transistor, if the voltage of the second node N1 is larger than the first reference voltage VREF, the voltage level of the result signal of the second comparator 210 increases. Alternatively, if the voltage of the second node N1 is smaller than the first reference voltage VREF, the voltage level of the result signal of the second comparator 210 decreases.

When the voltage level of the result signal of the second comparator 210 increases, since the amount of current flowing from the source to the drain of the third transistor M3 decreases, the voltage level of the second node N1 decreases. When the voltage level of the second node N1 decreases to become lower than the first reference voltage VREF, since the voltage level of the result signal of the second comparator 210 decreases, the amount of current flowing from the source to the drain of the third transistor M3 increases. As a result, the voltage level of the second node N1 increases. With repetition of the process, the voltage level of the second node N1 becomes equal to the voltage level of the first reference voltage VREF.

The voltage control circuit 100 is disposed inside the DC-DC conversion circuit 100 and adds a dropout voltage to the first reference voltage VREF to generate the second reference voltage VREF'. Here, the dropout voltage refers to a voltage corresponding to a voltage obtained by subtracting the output voltage of the voltage regulator 200 from the output voltage of the DC-DC conversion circuit 100. For example, the dropout voltage may correspond to a voltage obtained by subtracting the voltage level of the second node N1 from the voltage level of the first node N0. As another example, the dropout voltage may correspond to a gate-source voltage $V_{GS}$ of the third transistor M3 of the voltage regulator 200.

In some example embodiments of the present disclosure, the voltage control circuit 100 may include a level shift circuit that shifts and outputs the level of the input voltage. However, the scope of the present disclosure is not limited thereto, and the voltage control circuit 100 may be implemented as any circuit that may convert the voltage level of the first reference voltage VREF into another value.

According to an example embodiment, the dropout voltage is kept constant during operation of the semiconductor circuit of the present disclosure, and the output voltage of the DC-DC conversion circuit 100 changes depending on the fluctuation of the output voltage of the voltage regulator 200.

For example, when a target output voltage of the voltage regulator 200 is 5 V, the first reference voltage VREF will be determined to 5 V. In this case, when the dropout voltage is determined to 0.5 V, the voltage control circuit 100 may output the second reference voltage VREF' of 5.5 V by adding 0.5 V to 5 V. As a result, the output voltage of the DC-DC conversion circuit 100 will have a voltage level of about 5.5 V.

As another example, when the target output voltage of the voltage regulator 200 is 1 V, the first reference voltage VREF will be determined to 1 V. In this case, when the dropout voltage is determined to 0.5 V, the voltage control circuit 100 may output the second reference voltage VREF' of 1.5 V by adding 0.5 V to 1 V. As a result, the output voltage of the DC-DC conversion circuit 100 will have a voltage level of about 1.5 V.

That is, the output voltage of the DC-DC conversion circuit 100 changes depending on the fluctuation of the output voltage of the voltage regulator 200 so that the dropout voltage becomes constant. As a result, the semiconductor system 1 addresses the problem of power loss and heat generation due to fluctuation of the output voltage of the voltage regulator 200.

Figure 3:
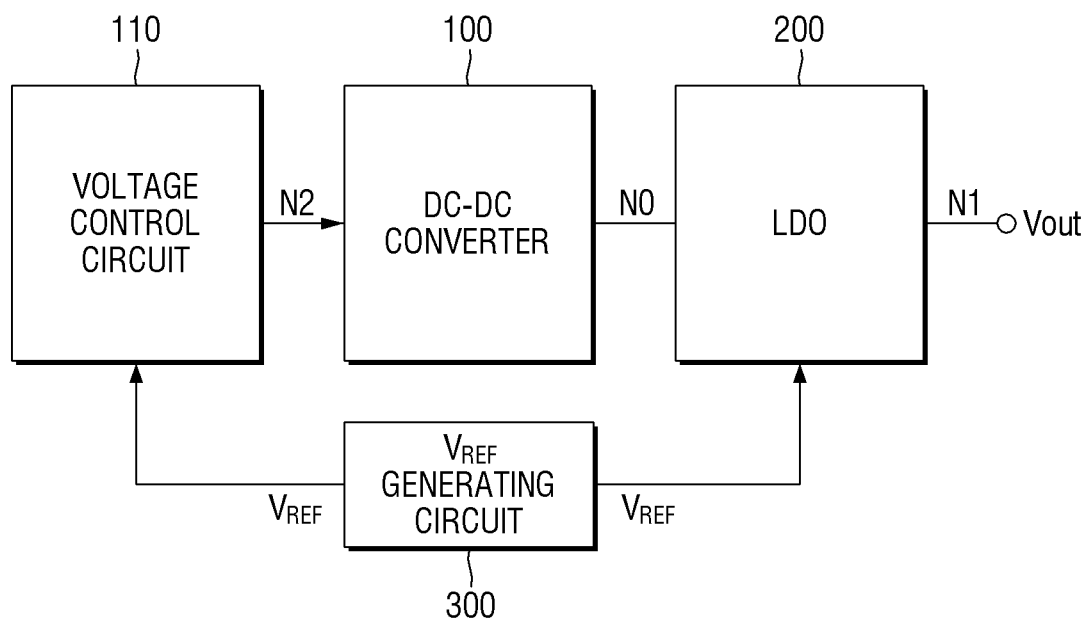
FIG. 3 is a schematic diagram illustrating a semiconductor system according to another example embodiment of the present disclosure.

FIG. 3 is a schematic diagram illustrating a semiconductor system according to another example embodiment of the present disclosure.

Referring to FIG. 3, the semiconductor system 2 according to another example embodiment of the present disclosure includes a DC-DC conversion circuit 100, a voltage control circuit 110, a voltage regulator 200 and a reference voltage generating circuit 300.

In an example embodiment, the voltage control circuit 110 is disposed outside the DC-DC conversion circuit 100. Further, the voltage control circuit 110 provides the second reference voltage VREF' to the DC-DC conversion circuit 100 through the third node N2.

As a result, the DC-DC conversion circuit 100 receives the second reference voltage VREF' that is output from the voltage control circuit 110 through the third node N2, and after executing the DC-DC conversion on the basis thereof, outputs the output thereof to the first node N0. Further, the voltage regulator 200 executes the voltage regulating on the basis of the first reference voltage VREF that is output from the reference voltage generating circuit 300 and the voltage of the first node N0, and provides the output thereof to the second node N1.

Figure 4:
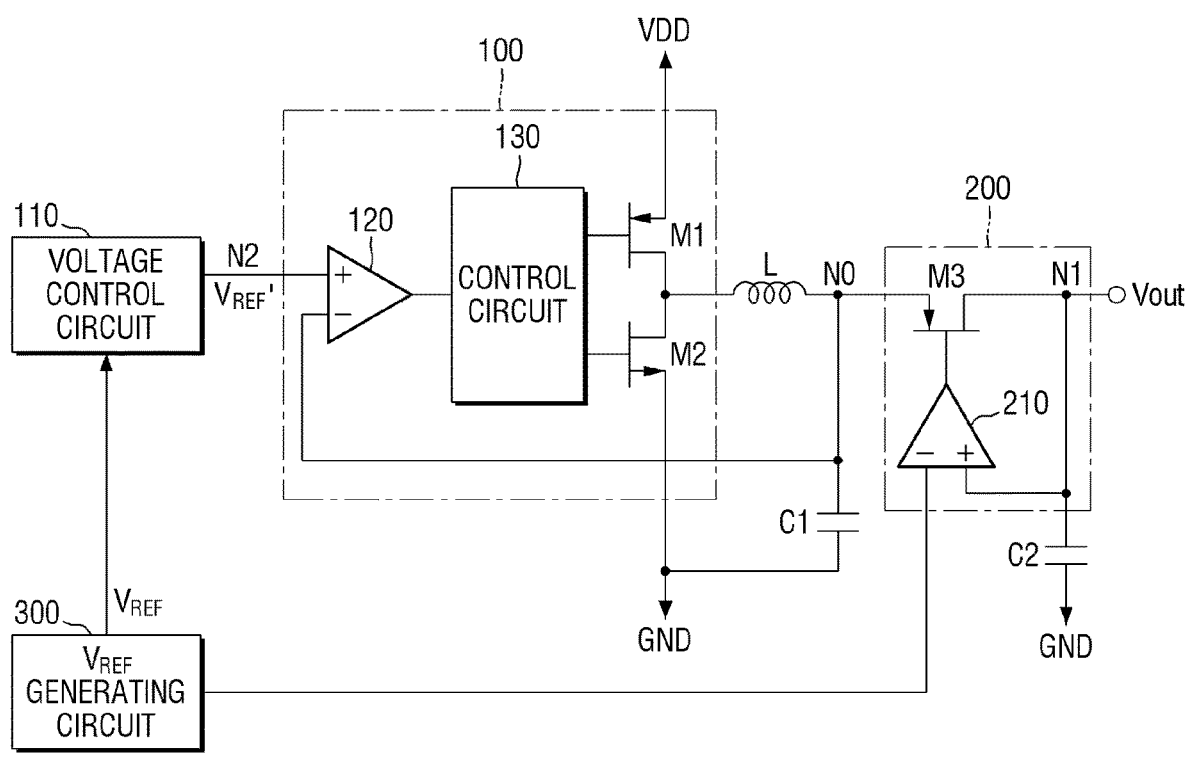
FIG. 4 is a circuit diagram illustrating a semiconductor system according to another example embodiment of the present disclosure.

FIG. 4 is a circuit diagram illustrating a semiconductor system according to another example embodiment of the present disclosure.

Referring to FIG. 4, the semiconductor system 2 according to another example embodiment of the present disclosure includes a DC-DC conversion circuit 100, a voltage control circuit 110, a voltage regulator 200 and a reference voltage generating circuit 300.

The DC-DC conversion circuit 100 includes a first comparator 120, a control circuit 130, a first transistor M1, and a second transistor M2.

A non-inverting terminal (+) of the first comparator 120 is connected to the third node N2. Thus, the second reference voltage VREF' provided from the voltage control circuit 110 via the third node N2 is applied to the non-inverting terminal (+) of the first comparator 120. The first comparator 120 provides a result signal obtained by comparing the non-inverting terminal (+) with the inverting terminal (−), to which the voltage of the first node N0 is applied, to the control circuit 130.

The voltage control circuit 110 is disposed outside the DC-DC conversion circuit 100, receives the first reference voltage VREF from the reference voltage generating circuit 300 to output the second reference voltage VREF', and provides the second reference voltage VREF' to the third node N2.

In addition, repeated description of the contents explained in FIG. 2 will not be provided. According to an example embodiment, the output voltage of the DC-DC conversion circuit 100 varies in accordance with the fluctuation of the output voltage of the voltage regulator 200 so that the dropout voltage becomes constant. As a result, the semiconductor system 2 addresses the problem of power loss and heat generation due to fluctuation of the output voltage of the voltage regulator. Further, by disposing the voltage control circuit 110 outside the DC-DC conversion circuit 100, expandability and design flexibility can be enhanced.

Figure 5:
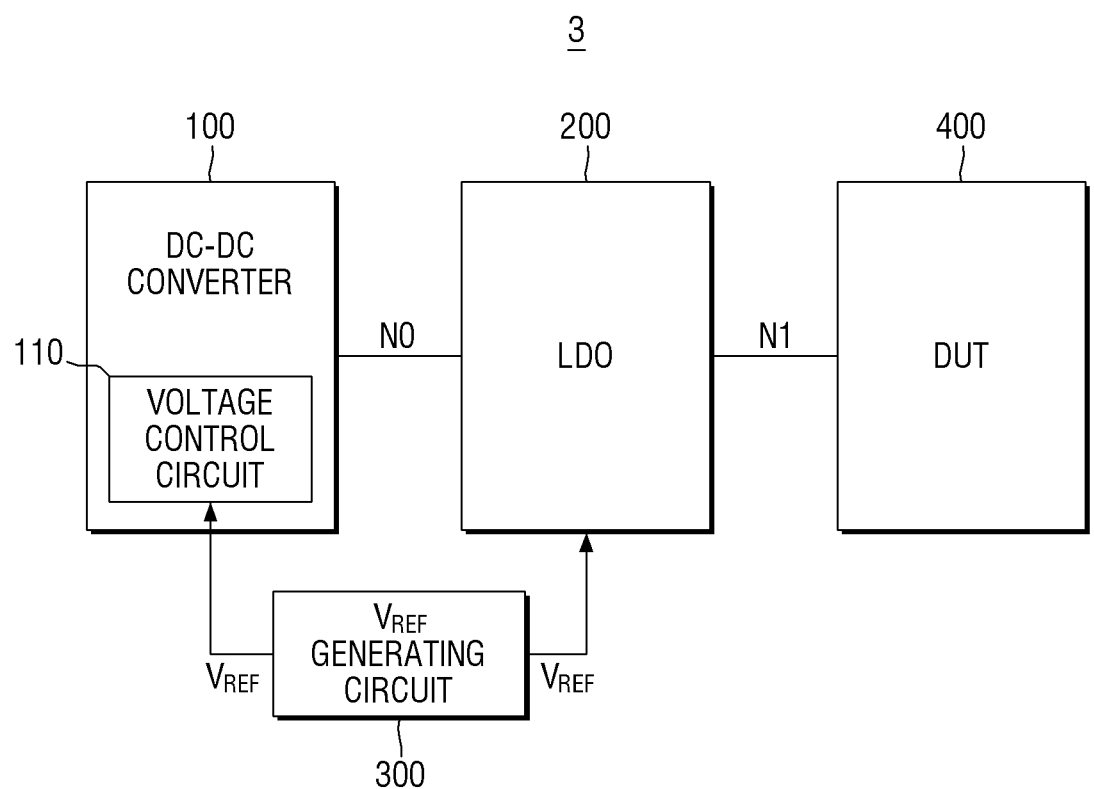
FIG. 5 is a schematic diagram for explaining a semiconductor system according to still another example embodiment of the present disclosure.

FIG. 5 is a schematic diagram for explaining a semiconductor system according to still another example embodiment of the present disclosure.

Referring to FIG. 5, the semiconductor system 3 according to still another example embodiment of the present disclosure includes a DC-DC conversion circuit 100, a voltage regulator 200, a reference voltage generating circuit 300 and a device under test (DUT) 400.

The device under test 400 includes a semiconductor circuit formed through a semiconductor fabricating process. The device under test 400 may be, for example, a volatile memory device including a SRAM (Static RAM), a DRAM (Dynamic RAM), a SDRAM (Synchronous DRAM), and the like, and a nonvolatile memory device including a ROM (Read Only Memory), a PROM (Programmable ROM), an EPROM (Electrically Programmable ROM), an EEPROM (Electrically Erasable and Programmable ROM), a flash memory, a PRAM (Phase-change RAM), an MRAM (Magnetic RAM), a RRAM (Resistive RAM), a FRAM (Ferroelectric RAM) and the like. Alternatively, the device under test 400 may be a non-memory device such as a microprocessor, a controller, a logic circuit, or the like. Alternatively, the device under test 400 may be a system semiconductor device such as a system LSI (large scale integration) in which a logic circuit and a memory circuit are integrated.

On the other hand, the device under test 400 may be a semiconductor device of a wafer level in which circuit elements are formed through the semiconductor fabricating process before a packaging process is executed. Alternatively, the device under test 400 may be a semiconductor die in which a semiconductor wafer having a semiconductor circuit formed thereon is divided through a dicing process. Alternatively, the device under test 400 may be a semiconductor package in which a semiconductor die having the semiconductor circuit formed thereon is packaged. Alternatively, the device under test 400 may be in the form of an integrated package in which a plurality of identical types or different types of semiconductor packages is integrated into a single package.

In an example embodiment, the voltage regulator 200 may provide the drive voltage Vout to the device under test 400 through the second node N1. That is, the semiconductor system 3 according to an example embodiment is a system which tests the device under test 400, and may supply the power to the device under test 400, using the DC-DC conversion circuit 100 and the voltage regulator 200 implemented integrally.

Figure 6:
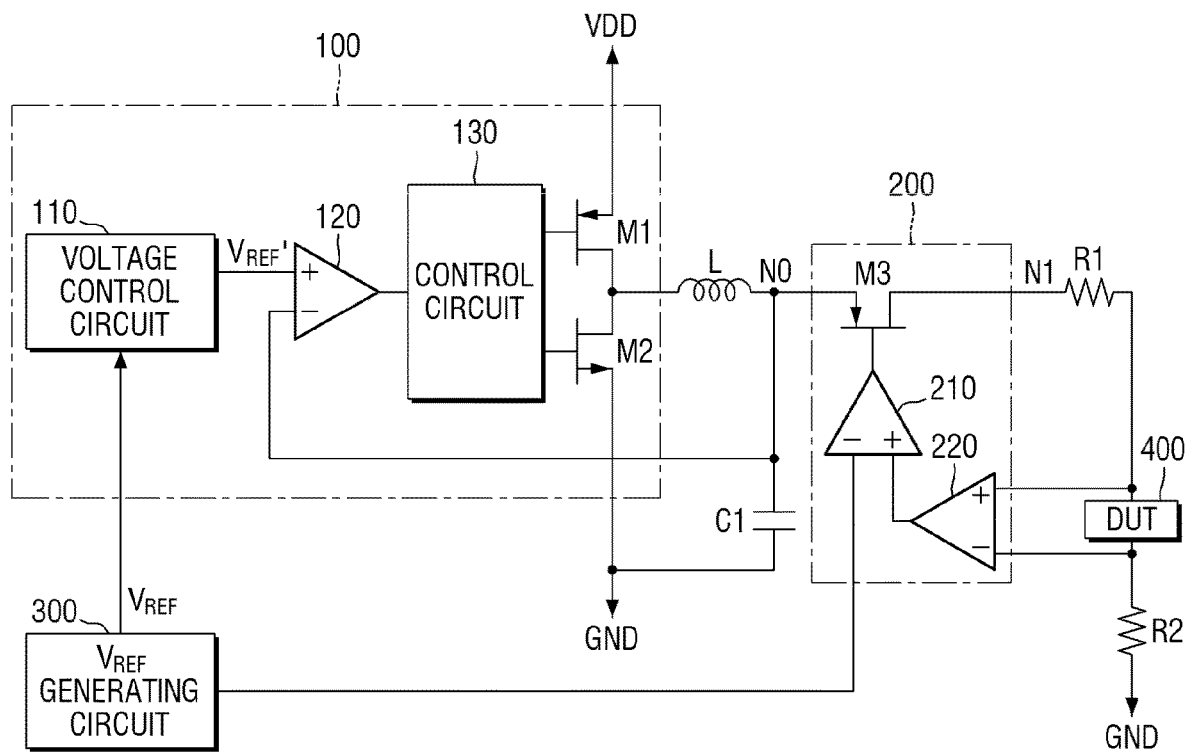
FIG. 6 is a circuit diagram illustrating a semiconductor system according to still another example embodiment of the present disclosure.

FIG. 6 is a circuit diagram illustrating a semiconductor system according to still another example embodiment of the present disclosure.

Referring to FIG. 6, the semiconductor system 3 according to still another example embodiment of the present disclosure includes a DC-DC conversion circuit 100, a voltage regulator 200, a reference voltage generating circuit 300 and a device under test 400.

The DC-DC conversion circuit 100 includes a voltage control circuit 110, a first comparator 120, a control circuit 130, a first transistor M1, and a second transistor M2. Since the contents thereof overlap the contents described in FIG. 2, the explanation thereof will not be provided here.

The voltage regulator 200 includes a second comparator 210, a third comparator 220 and a third transistor M3.

The first reference voltage VREF provided from the reference voltage generating circuit 300 is applied to the inverting terminal (−) of the second comparator 210. The output of the third comparator 220 is connected to the non-inverting terminal (+). The second comparator 210 provides a result signal obtained by comparing the non-inverting terminal (+) with the inverting terminal (−) to the third transistor M3.

The non-inverting terminal (+) of the third comparator 220 is connected to one end of the device under test 400, and the inverting terminal (−) of the third comparator 220 is connected to the other end of the device under test 400. The third comparator 220 provides a result signal obtained by comparing the non-inverting terminal (+) with the inverting terminal (−) to the second comparator 210.

The third transistor M3 is gated by the output signal of the second comparator 210 and provides the voltage of the first node N0 to the second node N1. In an example embodiment, the third transistor M3 may be a P type transistor, but the scope of the present disclosure is not limited thereto. In this case, the source of the third transistor M3 may be connected to the first node N0, and the drain of the third transistor M3 may be connected to the second node N1.

Repeated explanation of the contents described in FIGS. 2 and 4 will not be provided. According to an example embodiment, the output voltage of the DC-DC conversion circuit 100 varies in accordance with the fluctuation of the output voltage of the voltage regulator 200 so that the dropout voltage becomes constant. As a result, the semiconductor system 3 addresses the problem of power loss and heat generation due to fluctuation of the output voltage of the voltage regulator. Furthermore, by sensing the electrical characteristics of the device under test 400, using the third comparator 220, the test accuracy of the device under test 400 can be improved.

Figure 7:
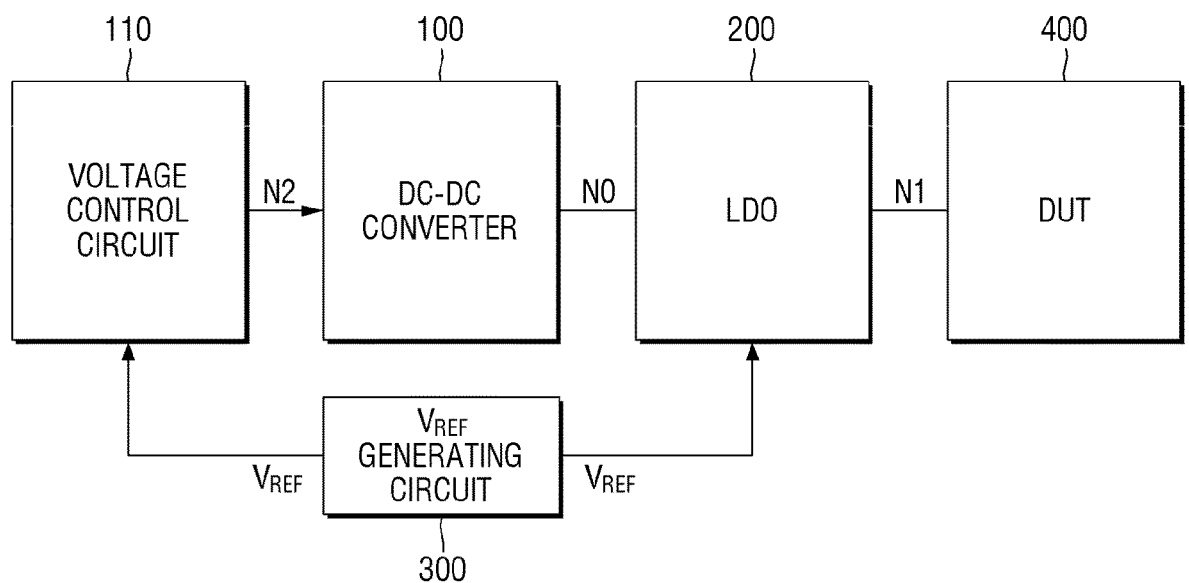
FIG. 7 is a schematic diagram for explaining a semiconductor system according to still another example embodiment of the present disclosure.

FIG. 7 is a schematic diagram for explaining a semiconductor system according to still another example embodiment of the present disclosure.

Referring to FIG. 7, a semiconductor system 4 according to still another example embodiment of the present disclosure includes a DC-DC conversion circuit 100, a voltage control circuit 110, a voltage regulator 200, a reference voltage generating circuit 300 and a device under test 400.

In an example embodiment, the voltage control circuit 110 is disposed outside the DC-DC conversion circuit 100. Further, the voltage control circuit 110 provides the second reference voltage VREF' to the DC-DC conversion circuit 100 through the third node N2.

As a result, the DC-DC conversion circuit 100 receives the second reference voltage VREF' that is output from the voltage control circuit 110 through the third node N2, executes the DC-DC conversion on the basis thereof, and then provides the output thereof to the first node N0. Further, the voltage regulator 200 executes the voltage regulating on the basis of the first reference voltage VREF that is output from the reference voltage generating circuit 300 and the voltage of the first node N0, and may provide the output thereof as the drive voltage Vout to the device under test 400 through the second node N1.

Figure 8:
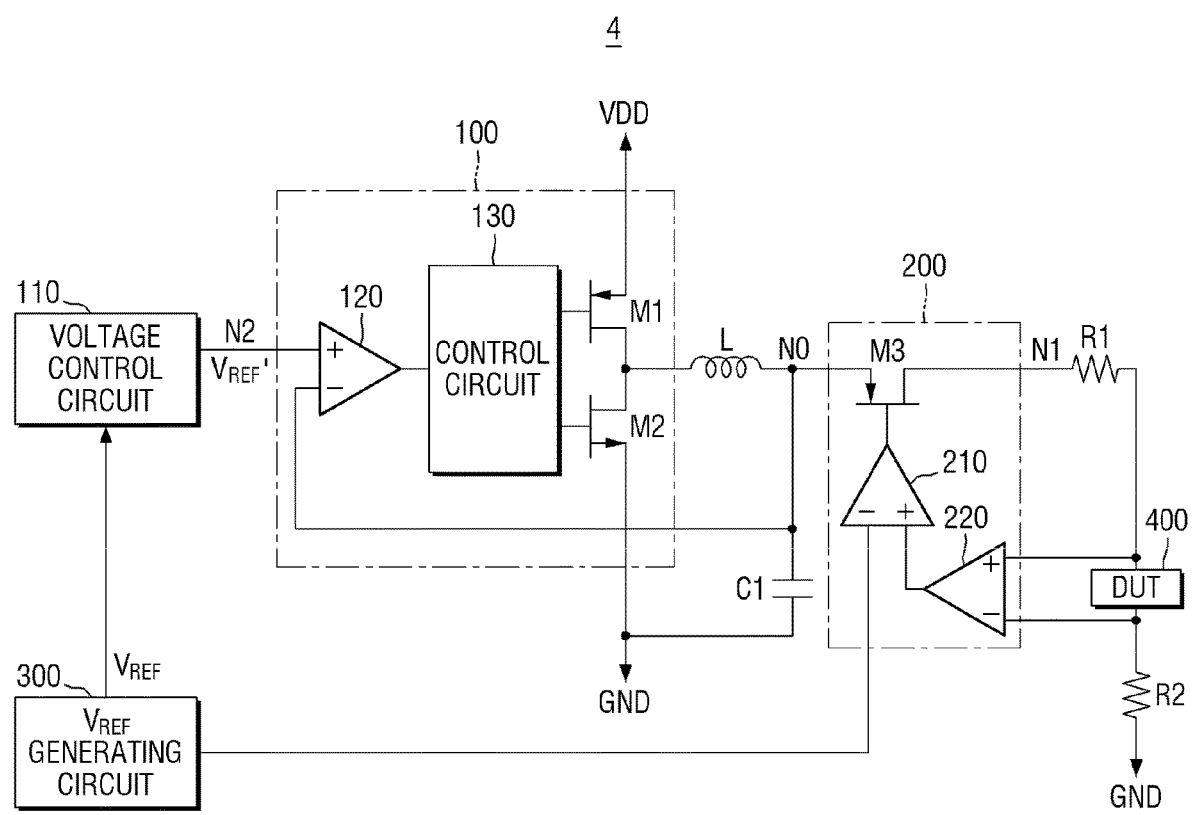
FIG. 8 is a circuit diagram illustrating a semiconductor system according to still another example embodiment of the present disclosure.

FIG. 8 is a circuit diagram illustrating a semiconductor system according to another example embodiment of the present disclosure.

Referring to FIG. 8, the semiconductor system 4 according to still another example embodiment of the present disclosure includes a DC-DC conversion circuit 100, a voltage control circuit 110, a voltage regulator 200, a reference voltage generating circuit 300 and a device under test 400.

The DC-DC conversion circuit 100 includes a first comparator 120, a control circuit 130, a first transistor M1, and a second transistor M2.

The non-inverting terminal (+) of the first comparator 120 is connected to the third node N2. Thus, a second reference voltage VREF' provided from the voltage control circuit 110 through the third node N2 is applied the non-inverting terminal (+) of the first comparator 120. The first comparator 120 provides a result signal obtained by comparing the non-inverting terminal (+) with the inverting terminal (−), to which the voltage of the first node N0 is applied, to the control circuit 130.

The voltage control circuit 110 is disposed outside the DC-DC conversion circuit 100, receives the first reference voltage VREF from the reference voltage generating circuit 300 to output a second reference voltage VREF', and provides the second reference voltage VREF' to the third node N2.

In addition, repeated description of the contents explained in FIG. 6 will not be provided. According to an example embodiment, the output voltage of the DC-DC conversion circuit 100 varies in accordance with the fluctuation of the output voltage of the voltage regulator 200 so that the dropout voltage becomes constant. As a result, the semiconductor system 4 addresses the problem of power loss and heat generation due to fluctuation of the output voltage of the voltage regulator. Further, by disposing the voltage control circuit 110 outside the DC-DC conversion circuit 100, expandability and design flexibility can be enhanced. Furthermore, the test accuracy of the device under test 400 can be improved, by sensing the electrical characteristics of the device under test 400 using the third comparator 220.

Figure 9:
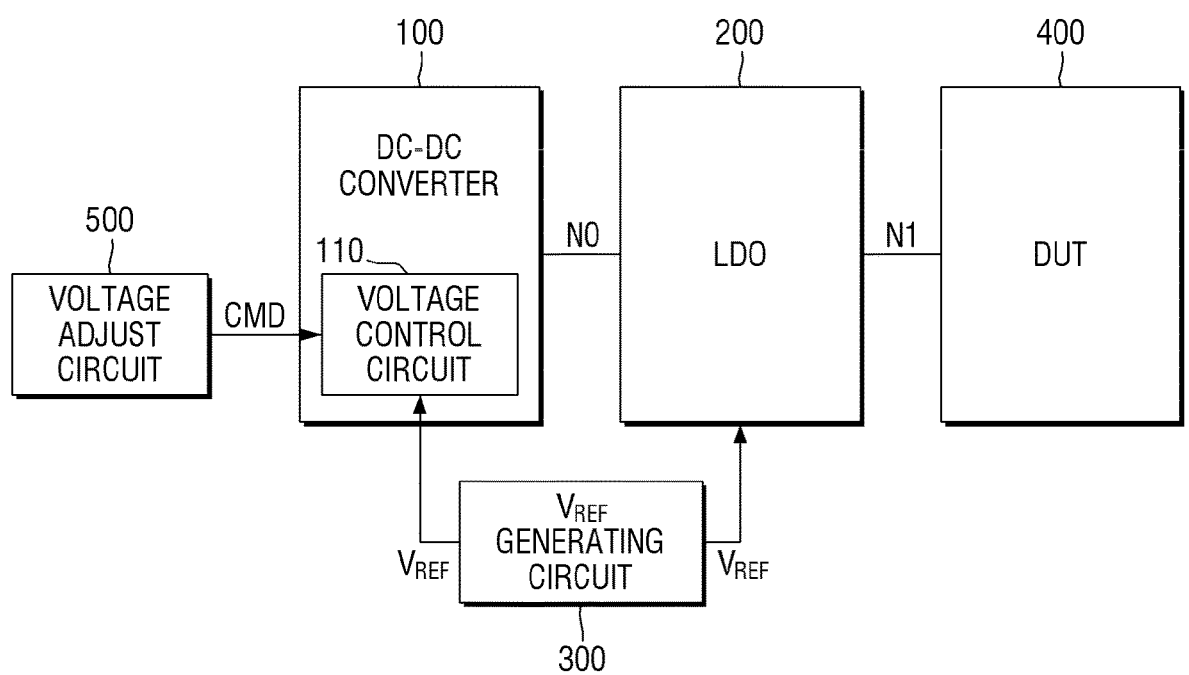
FIG. 9 is a schematic diagram for explaining a semiconductor system according to still another example embodiment of the present disclosure.

FIG. 9 is a schematic diagram for explaining a semiconductor system according to still another example embodiment of the present disclosure.

Referring to FIG. 9, a semiconductor system 5 according to still another example embodiment of the present disclosure includes a DC-DC conversion circuit 100, a voltage regulator 200, a reference voltage generating circuit 300, a device under test 400 and a voltage adjust circuit 500.

The voltage adjust circuit 500 transmits the command signal CMD to the voltage control circuit 110, such that the voltage control circuit 110 may adjust the level of the second reference voltage VREF' on the basis of the command signal CMD. According to the above embodiments, the voltage control circuit 110 determines the level of the second reference voltage VREF' to meet the purpose of keeping the dropout voltage constant. However, it may be desirable to change the level of the second reference voltage VREF' in the course of executing the test on the device under test 400, for example, in order to grasp the maximum efficiency of the device under test 400, in order to grasp the balance degree of various parameters or for other various purposes. In such a case, the user may customize the operation of the voltage control circuit 110 via the voltage adjust circuit 500.

The command signal CMD transmitted by the voltage adjust circuit 500 to the voltage control circuit 110 may be variously implemented in accordance with various rules. For example, when the voltage control circuit 110 is designed to be able to output a plurality of voltage levels, the command signal CMD may be implemented as a signal for selecting one output among the plurality of voltage levels. Alternatively, when the voltage control circuit 110 is designed to be able to dynamically change the voltage level, the command signal CMD may have a value associated with a voltage level to be variable. Such examples do not limit the scope of the present disclosure.

In an example embodiment, the voltage adjust circuit 500 transmits the command signal CMD to the voltage control circuit 110 according to the purpose of the test of the device under test 400, and the voltage regulator 200 may provide the drive voltage Vout to the device under test 400 through the second node N1. That is, the semiconductor system 5 according to an example embodiment is a system that testes the device under test 400, and may supply a power that matches the specific test purpose to the device under test 400, using the DC-DC conversion circuit 100 and the voltage regulator 200 implemented integrally.

Figure 10:
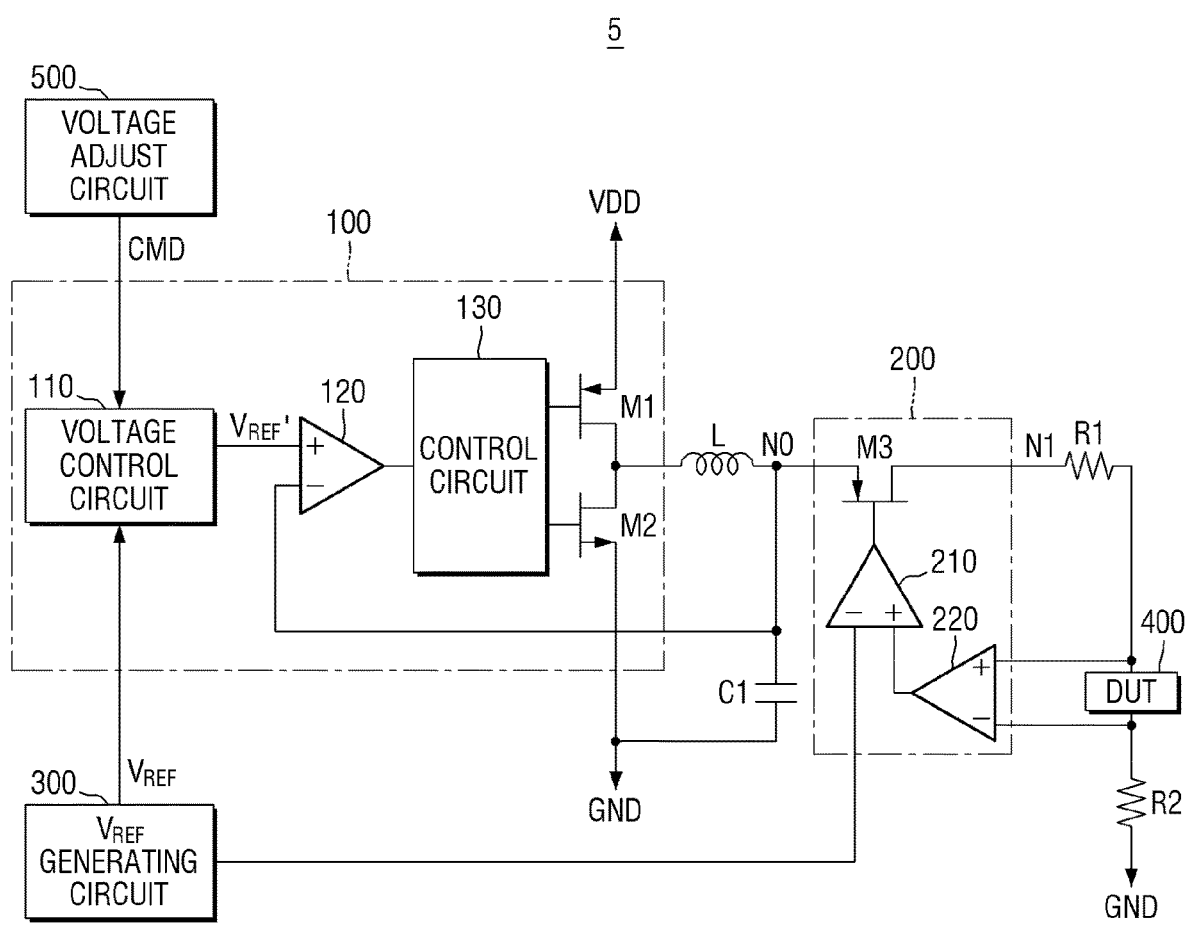
FIG. 10 is a circuit diagram illustrating a semiconductor system according to still another example embodiment of the present disclosure.

FIG. 10 is a circuit diagram illustrating a semiconductor system according to still another example embodiment of the present disclosure.

Referring to FIG. 10, the semiconductor system 5 according to still another example embodiment of the present disclosure includes a DC-DC conversion circuit 100, a voltage regulator 200, a reference voltage generating circuit 300, a device under test 400 and a voltage adjust circuit 500.

The DC-DC conversion circuit 100 includes a voltage control circuit 110, a first comparator 120, a control circuit 130, a first transistor M1, and a second transistor M2. Since the contents thereof overlap those described in FIG. 2, the explanation thereof will not be provided here.

The voltage regulator 200 includes a second comparator 210, a third comparator 220 and a third transistor M3. Since the contents thereof overlap those described in FIG. 6, the explanation thereof will not be provided here.

According to an example embodiment, it is possible to widen the test range of the device under test 400, by supplying power that matches the specific test purpose to the device under test 400. Furthermore, by sensing the electrical characteristics of the device under test 400 using the third comparator 220, the test accuracy of the device under test 400 can be improved.

Figure 11:
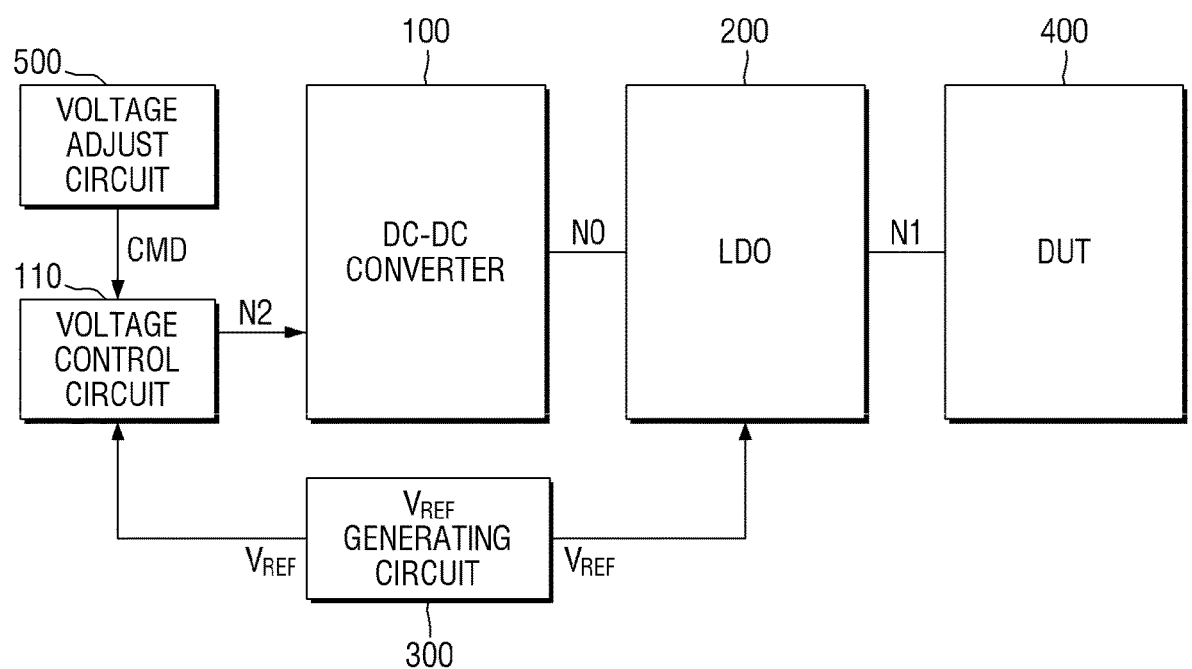
FIG. 11 is a schematic diagram for explaining a semiconductor system according to still another example embodiment of the present disclosure.

FIG. 11 is a schematic diagram for explaining a semiconductor system according to still another example embodiment of the present disclosure.

Referring to FIG. 11, a semiconductor system 6 according to another example embodiment of the present disclosure includes a DC-DC conversion circuit 100, a voltage control circuit 110, a voltage regulator 200, a reference voltage generating circuit 300, a device under test 400 and a voltage adjust circuit 500.

In an example embodiment, the voltage control circuit 110 is disposed outside the DC-DC conversion circuit 100. Further, the voltage control circuit 110 provides the second reference voltage VREF' to the DC-DC conversion circuit 100 through the third node N2.

As a result, the DC-DC conversion circuit 100 receives the second reference voltage VREF' that is output from the voltage control circuit 110 through the third node N2, executes the DC-DC conversion on the basis thereof, and then provides the output thereof to the first node N0. Further, the voltage regulator 200 executes the voltage regulating on the basis of the first reference voltage VREF that is output from the reference voltage generating circuit 300, and the voltage of the first node N0, and may provide the output thereof as the drive voltage Vout to the device under test 400 through the second node N1.

Figure 12:
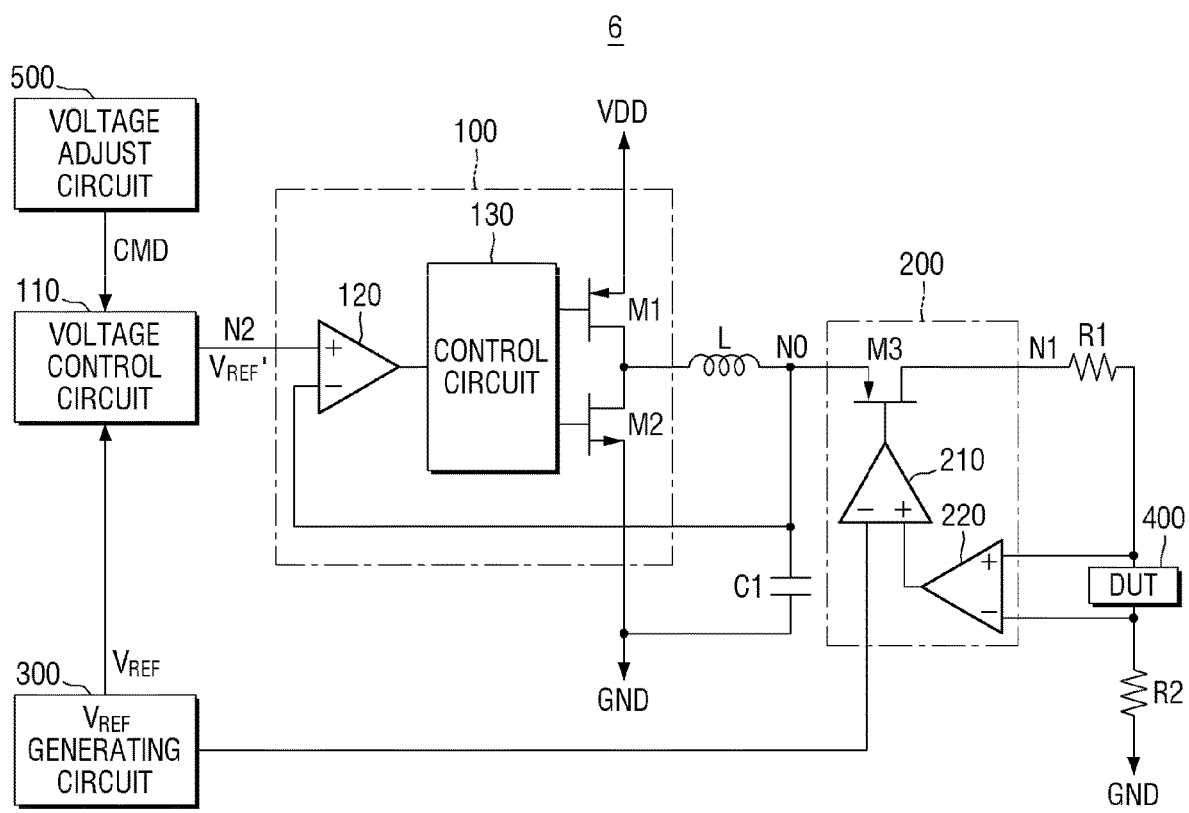
FIG. 12 is a circuit diagram illustrating a semiconductor system according to still another example embodiment of the present disclosure.

FIG. 12 is a circuit diagram illustrating a semiconductor system according to still another example embodiment of the present disclosure.

Referring to FIG. 12, a semiconductor system 6 according to another example embodiment of the present disclosure includes a DC-DC conversion circuit 100, a voltage control circuit 110, a voltage regulator 200, a reference voltage generating circuit 300, a device under test 400 and a voltage adjust circuit 500.

The DC-DC conversion circuit 100 includes a first comparator 120, a control circuit 130, a first transistor M1, and a second transistor M2.

The non-inverting terminal (+) of the first comparator 120 is connected to the third node N2. Thus, the second reference voltage VREF' provided from the voltage control circuit 110 through the third node N2 is applied to the non-inverting terminal (+) of the first comparator 120. The first comparator 120 provides a result signal obtained by comparing the non-inverting terminal (+), and the inverting terminal (−), to which the voltage of the first node N0 is applied, to the control circuit 130.

The voltage control circuit 110 is disposed outside the DC-DC conversion circuit 100, receives the first reference voltage VREF from the reference voltage generating circuit 300 to output the second reference voltage VREF', and provides the second reference voltage VREF' to the third node N2.

In addition, descriptions of contents overlapping the contents explained in FIG. 10 will not be provided. According to an example embodiment, it is possible to widen the test range of the device under test 400 by supplying power that matches the specific test purpose to the device under test 400. Further, by disposing the voltage control circuit 110 outside the DC-DC conversion circuit 100, expandability and design flexibility can be enhanced. Furthermore, it is possible to improve the test accuracy of the device under test 400, by sensing the electrical characteristics of the device under test 400, using the third comparator 220.

In some example embodiments, elements of the semiconductor system 1 (e.g., the voltage control circuit 110, the control circuit 130, the reference voltage generating circuit 300 and/or the voltage adjust circuit 500) may be implemented using hardware, a combination of hardware and software, or a non-transitory storage medium storing software that is executable to perform the functions of the same.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be illustrated as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

In concluding the detailed description, those skilled in the art will appreciate that many variations and modifications may be made to the example embodiments without substantially departing from the principles of the present disclosure. Therefore, the disclosed example embodiments are used in a generic and descriptive sense only and not for purposes of limitation.

What is claimed is:

1. A semiconductor circuit comprising:
    a voltage control circuit configured to generate a second reference voltage by adding, to a first reference voltage, a dropout voltage corresponding to a difference between an input voltage and an output voltage;
    a DC-DC conversion circuit configured to perform DC-DC conversion based on the second reference voltage to generate the input voltage such that the dropout voltage corresponding to the difference between the input voltage and the output voltage is constantly maintained at a difference between the second reference voltage and the first reference voltage, and to provide the input voltage to a first node; and
    a voltage regulator configured to generate the output voltage by regulating the input voltage based on the first reference voltage and the input voltage; and
    a reference voltage generating circuit configured to generate a first reference voltage, and to separately provide the first reference voltage to both the voltage control circuit that generates the second reference voltage used to generate the input voltage and to the voltage regulator that regulates the input voltage to generate the output voltage.

2. The semiconductor circuit of claim 1, wherein the semiconductor circuit is configured to maintain the dropout voltage at a constant voltage level during operation of the semiconductor circuit irrespective of variations in the input voltage generated by the DC-DC-conversion circuit due to fluctuations in the output voltage generated by the voltage regulator.

3. The semiconductor circuit of claim 1, wherein the DC-DC conversion circuit comprises:
    a first comparator including a non-inverting terminal and an inverting terminal, the non-inverting terminal configured to receive the second reference voltage and the inverting terminal configured to receive the input voltage from the first node,
    a control circuit configured to receive an output signal of the first comparator, and to generate a first control signal and a second control signal based on the output signal,
    a first transistor having a gate configured to receive the first control signal, the first transistor configured to selectively provide a power supply voltage to the first node based on the first control signal, and
    a second transistor having a gate configured to receive the second control signal, the second transistor configured to selectively provide a ground voltage to the first node based on the second control signal.

4. The semiconductor circuit of claim 3, wherein
    the first transistor is a P type transistor,
    the second transistor is an N-type transistor, and
    a drain of the first transistor is connected to a drain of the second transistor.

5. The semiconductor circuit of claim 1, wherein the voltage regulator comprises:
    a second comparator including an inverting terminal and a non-inverting terminal, the inverting terminal configured to receive the first reference voltage and the non-inverting terminal configured to receive the output voltage of the second node, and
    a third transistor having a gate configured to receive an output signal of the second comparator, the third transistor configured to selectively provide a voltage of the first node to the second node based on the output signal.

6. The semiconductor circuit of claim 5, wherein the third transistor is a P type transistor, the third transistor including a source and a drain, the source of the third transistor being connected to the first node such that the source of the third transistor receives the input voltage, and the drain of the third transistor being connected to the second node such that the drain of the third transistor receives the output voltage.

7. The semiconductor circuit of claim 1, wherein the voltage control circuit comprises:
    a level shift circuit.

8. The semiconductor circuit of claim 1, wherein the voltage control circuit is disposed inside the DC-DC conversion circuit.

9. The semiconductor circuit of claim 1, wherein the voltage control circuit is disposed outside the DC-DC conversion circuit such that the voltage control circuit is configured to provide the second reference voltage to the DC-DC conversion circuit through a third node.

10. The semiconductor circuit of claim 1, wherein the voltage regulator is configured to provide a drive voltage to a device under test (DUT) through the second node, and the voltage regulator comprises:
    a third comparator including a non-inverting terminal and an inverting terminal, the non-inverted terminal configured to receive a first input from the device under test and the inverting terminal configured to receive a second input from the device under test,
    a second comparator including an inverting terminal and a non-inverting terminal, the inverting terminal configured to receive the first reference voltage and the non-inverting terminal configured to receive an output of the third comparator, and
    a third transistor having a gate configured to receive an output signal of the second comparator, the third transistor configured to selectively provide the input voltage of the first node to the second node based on the output signal.

11. The semiconductor circuit of claim 10, wherein the third transistor is a P type transistor, and the third transistor includes a source and a drain, the source of the third transistor being connected to the first node such that the source of the third transistor receives the input voltage, and the drain of the third transistor being connected to the second node such that the drain of the third transistor receives the output voltage.

12. The semiconductor circuit of claim 1, further comprising:
a voltage adjust circuit configured to transmit a command signal to the voltage control circuit, wherein
the voltage control circuit is configured to adjust a level of the second reference voltage based on the command signal.

13. A semiconductor circuit comprising:
a reference voltage generating circuit configured to generate a first reference voltage;
a DC-DC conversion circuit configured to perform DC-DC conversion based on a second reference voltage to generate an input voltage, and to provide the input voltage to a first node, the second reference voltage having a voltage level different from the first reference voltage; and
a voltage regulator configured to generate an output voltage by regulating the input voltage based on the first reference voltage and the input voltage such that the reference voltage generating circuit separately provides the first reference voltage to both the DC-DC conversion circuit that generates the input voltage and to the voltage regulator that regulates the input voltage to generate the output voltage, and to provide the output voltage to a second node, wherein
the semiconductor circuit is configured to maintain a constant difference between the input voltage output by the DC-DC conversion circuit and the output voltage output by the voltage regulator by varying the input voltage based on a difference between the second reference voltage and the first reference voltage such that the constant difference corresponds to the difference between the second reference voltage and the first reference voltage irrespective of variations in the input voltage due to fluctuations in the output voltage.

14. The semiconductor circuit of claim 13, wherein the DC-DC conversion circuit comprises:
a first comparator including a non-inverting terminal and an inverting terminal, the non-inverting terminal configured to receive the second reference voltage and the inverting terminal configured to receive the input voltage from the first node,
a control circuit configured to receive an output signal of the first comparator, and to generate a first control signal and a second control signal based on the output signal,
a first transistor having a gate configured to receive the first control signal, the first transistor configured to selectively provide a power supply voltage to the first node based on the first control signal, and
a second transistor having a gate configured to receive the second control signal, the second transistor configured to selectively provide a ground voltage to the first node based on the second control signal.

15. The semiconductor circuit of claim 14, wherein
the first transistor is a P type transistor,
the second transistor is an N-type transistor, and
a drain of the first transistor is connected to a drain of the second transistor.

16. The semiconductor circuit of claim 13, wherein the voltage regulator comprises:

a second comparator including an inverting terminal and a non-inverting terminal, the inverting terminal configured to receive the first reference voltage and the non-inverting terminal configured to receive the output voltage of the second node, and
a third transistor having a gate configured to receive an output signal of the second comparator, the third transistor configured to selectively provide a voltage of the first node to the second node based on the output signal.

17. The semiconductor circuit of claim 16, wherein the third transistor is a P type transistor, the third transistor further including a source and a drain, the source of the third transistor being connected to the first node such that the source of the third transistor receives the input voltage, and the drain of the third transistor being connected to the second node such that the drain of the third transistor receives the output voltage.

18. The semiconductor circuit of claim 13, wherein the voltage regulator is configured to provide a drive voltage to a device under test (DUT) through the second node, the voltage regulator comprises:
a third comparator having a non-inverting terminal and an inverting terminal, the non-inverted terminal configured to receive a first input from the device under test and the inverting terminal configured to receive a second input from the device under test,
a second comparator including an inverting terminal and a non-inverting terminal, the inverting terminal configured to receive the first reference voltage and the non-inverting terminal configured to receive an output of the third comparator, and
a third transistor having a gate configured to receive an output signal of the second comparator, the third transistor configured to selectively provide the input voltage of the first node to the second node based on the output signal.

19. A semiconductor circuit comprising:
a reference voltage generating circuit configured to generate a first reference voltage;
a voltage control circuit configured to receive the first reference voltage from the reference voltage generating circuit, and to generate a second reference voltage based on at least the first reference voltage;
a DC-DC conversion circuit configured to generate an input voltage, the input voltage being applied to a first node, the DC-DC conversion circuit including a first comparator, the first comparator having a non-inverting terminal and an inverting terminal, the non-inverting terminal configured to receive the second reference voltage and the inverting terminal configured to receive the input voltage applied to the first node; and
a voltage regulator configured to generate an output voltage, the voltage regulator including a second comparator, the second comparator having an inverting terminal configured to receive the first reference voltage such that the reference voltage generating circuit separately provides the first reference voltage to both the voltage control circuit that generates the second reference voltage used to generate the input voltage and to the voltage regulator that regulates the input voltage to generate the output voltage, the output voltage being applied to a second node.

* * * * *